(12) United States Patent
Hill et al.

(10) Patent No.: US 8,615,776 B2
(45) Date of Patent: Dec. 24, 2013

(54) VIDEO SEARCHING USING TV AND USER INTERFACE THEREFOR

(75) Inventors: Seth Guy Hill, La Mesa, CA (US); Jaime Chee, San Diego, CA (US); Ted Mark Dunn, Carlsbad, CA (US)

(73) Assignee: Sony Corporation, Tokyo (JP)

( * ) Notice: Subject to any disclaimer, the term of this patent is extended or adjusted under 35 U.S.C. 154(b) by 155 days.

(21) Appl. No.: 13/275,674

(22) Filed: Oct. 18, 2011

(65) Prior Publication Data

US 2012/0311636 A1    Dec. 6, 2012

Related U.S. Application Data

(63) Continuation-in-part of application No. 13/152,757, filed on Jun. 3, 2011.

(51) Int. Cl.
*H04N 7/025* (2006.01)

(52) U.S. Cl.
USPC ................................. 725/43; 44/45

(58) Field of Classification Search
None
See application file for complete search history.

(56) References Cited

U.S. PATENT DOCUMENTS

| | | | | |
|---|---|---|---|---|
| 5,425,077 A * | 6/1995 | Tsoi | ............................... | 455/566 |
| 5,633,912 A * | 5/1997 | Tsoi | ............................... | 455/566 |
| 5,835,087 A * | 11/1998 | Herz et al. | ..................... | 715/810 |
| 6,341,374 B2 * | 1/2002 | Schein et al. | ................... | 725/43 |
| 6,594,825 B1 * | 7/2003 | Goldschmidt Iki et al. | .... | 725/53 |
| 6,876,901 B2 | 4/2005 | Dilorenzo | | |
| 6,917,373 B2 * | 7/2005 | Vong et al. | ..................... | 715/840 |
| 7,293,275 B1 | 11/2007 | Krieger et al. | | |
| 7,698,263 B2 | 4/2010 | Pickelsimer et al. | | |
| 7,865,927 B2 | 1/2011 | Brodersen et al. | | |
| 8,291,451 B2 * | 10/2012 | Roberts et al. | .................. | 725/40 |
| 2001/0001160 A1 * | 5/2001 | Shoff et al. | ..................... | 725/51 |
| 2001/0037238 A1 * | 11/2001 | Gotoh et al. | .................... | 705/14 |
| 2002/0056090 A1 * | 5/2002 | Wagner et al. | .................. | 725/32 |
| 2002/0147984 A1 * | 10/2002 | Tomsen et al. | ................ | 725/109 |
| 2003/0007012 A1 * | 1/2003 | Bate | ............................... | 345/825 |
| 2006/0026638 A1 | 2/2006 | Stark et al. | | |
| 2006/0123451 A1 | 6/2006 | Preisman | | |
| 2006/0262116 A1 | 11/2006 | Moshiri et al. | | |
| 2007/0204297 A1 * | 8/2007 | Gonzalez | ........................ | 725/41 |
| 2008/0066100 A1 * | 3/2008 | Brodersen et al. | ............... | 725/35 |
| 2008/0276278 A1 | 11/2008 | Krieger et al. | | |
| 2009/0019489 A1 | 1/2009 | Ohlfs et al. | | |
| 2009/0199242 A1 | 8/2009 | Johnson et al. | | |
| 2009/0222757 A1 | 9/2009 | Gupta et al. | | |
| 2010/0251162 A1 | 9/2010 | Stallings et al. | | |
| 2010/0319027 A1 | 12/2010 | Kim | | |
| 2011/0047572 A1 | 2/2011 | Hill et al. | | |
| 2011/0138423 A1 * | 6/2011 | Pickelsimer et al. | ........... | 725/46 |
| 2011/0289529 A1 * | 11/2011 | Jordan et al. | .................... | 725/37 |
| 2012/0151530 A1 | 6/2012 | Krieger et al. | | |
| 2012/0278844 A1 | 11/2012 | Curtis et al. | | |

OTHER PUBLICATIONS

Apple, "The all-new Apple TV", http://www.apple.com/appletv/#whatis, data present on the date of search: Jan. 26, 2011.
Seth Guy Hill, Ted Mark Dunn, Jaimer Chee, "video searching Using TV and User Interfaces Therefor", related U.S. Appl. No. 13/275,817, non-final office action dated Feb. 21, 2013.
Seth Guy Hill, Jaime Chee, Ted Mark Dunn, "Video Searching Using TV and User Interfaces Therefor", related U.S. Appl. No. 13/152,757, non-final office action dated Dec. 21, 2012.
Seth Guy Hill, Jaime Chee, Ted Mark Dunn, "Video Searching Using TV and User Interfaces Therefor", related U.S. Appl. No. 13/152,757, applicants response to non-final office action filed Jan. 21, 2013.
Seth Guy Hill, Ted Mark Dunn, Jaime Chee, "Video Searching Using TV and User Interfaces Therefor", related U.S. Appl. No. 13/275,817, final office action dated May 20, 2013.
Seth Guy Hill, Ted Mark Dunn, Jaime Chee, "Video Searching Using TV and User Interfaces Therefor", related U.S. Appl. No. 13/275,817, applicant response to final office action filed May 23, 2013.
Seth Guy Hill, Jaime Chee, Ted Mark Dunn, "Video Searching Using TV and User Interfaces Therefor" related U.S. Appl. No. 13/152,757, non-final office action dated Mar. 20, 2013.
Seth Guy Hill, Jaime Chee, Ted Mark Dunn, "Video Searching Using TV and User Interfaces Therefor" related U.S. Appl. No. 13/152,757, applicant response to non-final office action filed May 20, 2013.

* cited by examiner

*Primary Examiner* — Brian Pendleton
*Assistant Examiner* — Fernando Alcon
(74) *Attorney, Agent, or Firm* — John L. Rogitz

(57) ABSTRACT

An audio video (AV) device presents a user interface (UI) on the display. The UI has plural UI selector elements, including a left-most column of tabbed selector elements including a "video" tab, a "cast" tab, a "related" tab, with the tabs representing types of information and/or AV programs related to a seed input to the processor. The tabbed selector elements are selectable to cause, the information and/or AV programs represented by the respective tab to be presented on a central information/video area. The UI also includes a right-most column of iconified selector elements for selecting respective AV program sources from which information and/or AV programs related to the seed are available. The iconified selector elements are selectable to cause information and/or AV programs related to the seed to be received from the respective source and presented on the central information/video area.

20 Claims, 7 Drawing Sheets

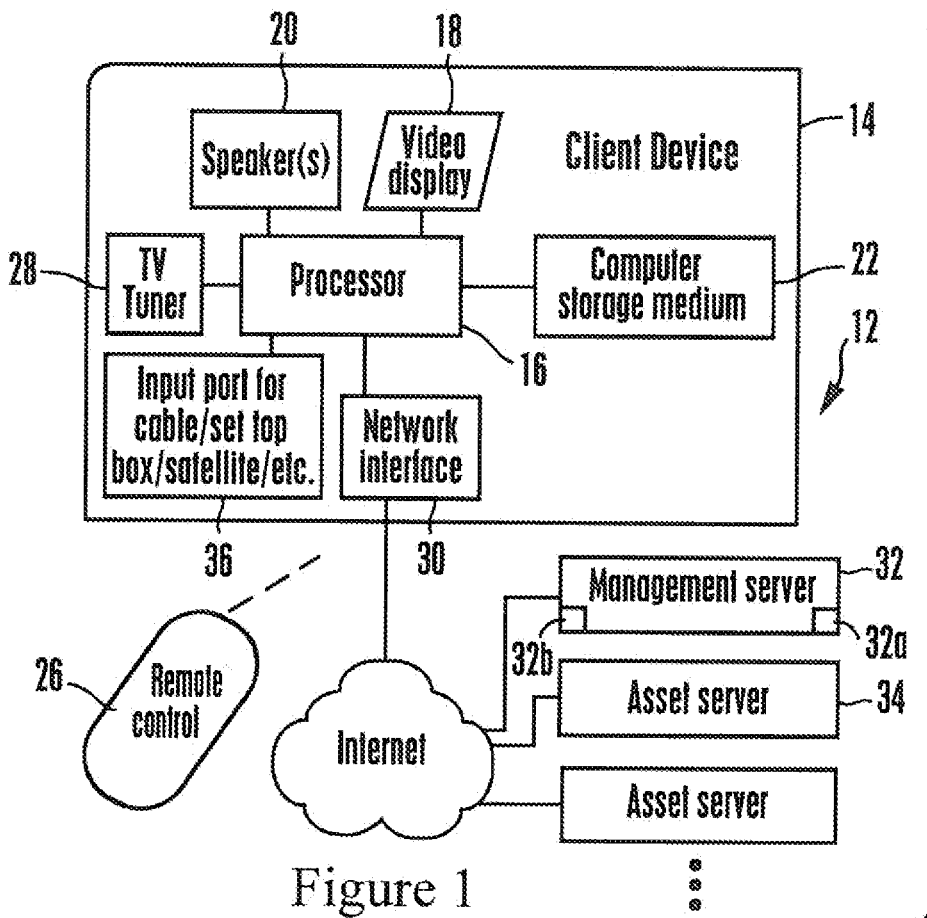
Figure 1
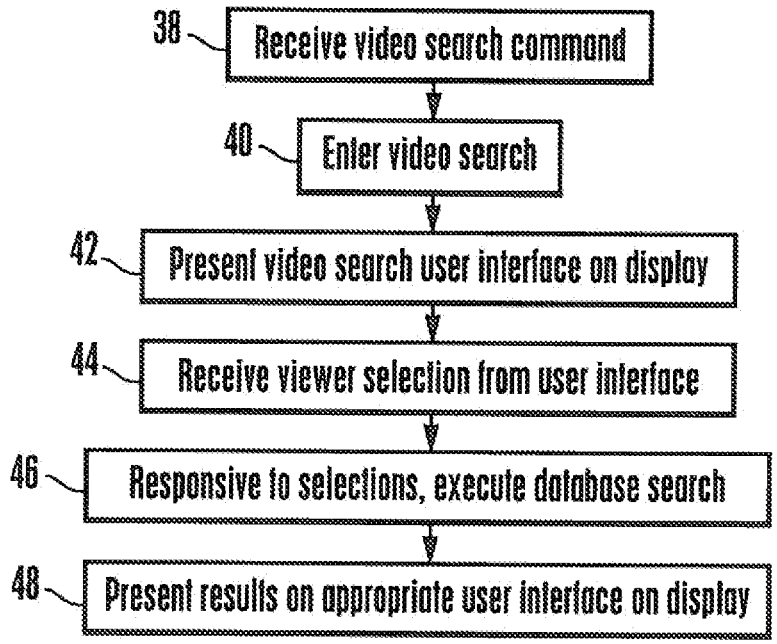
Figure 2 overall logic

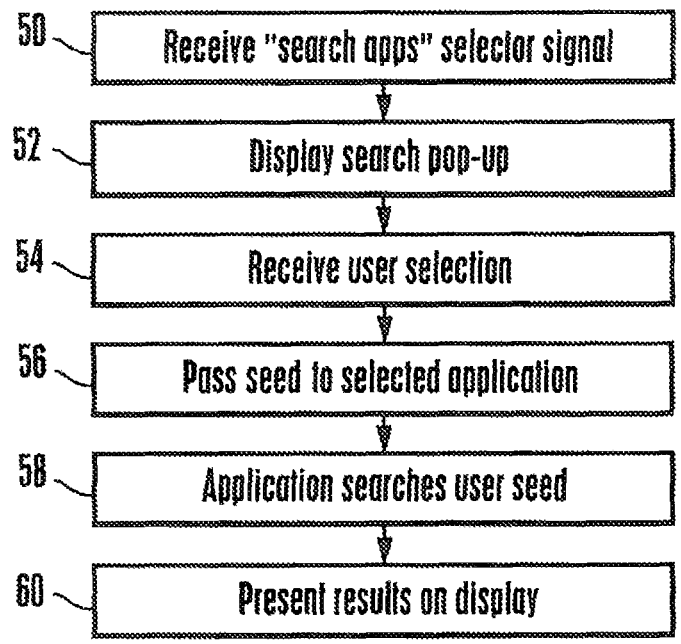
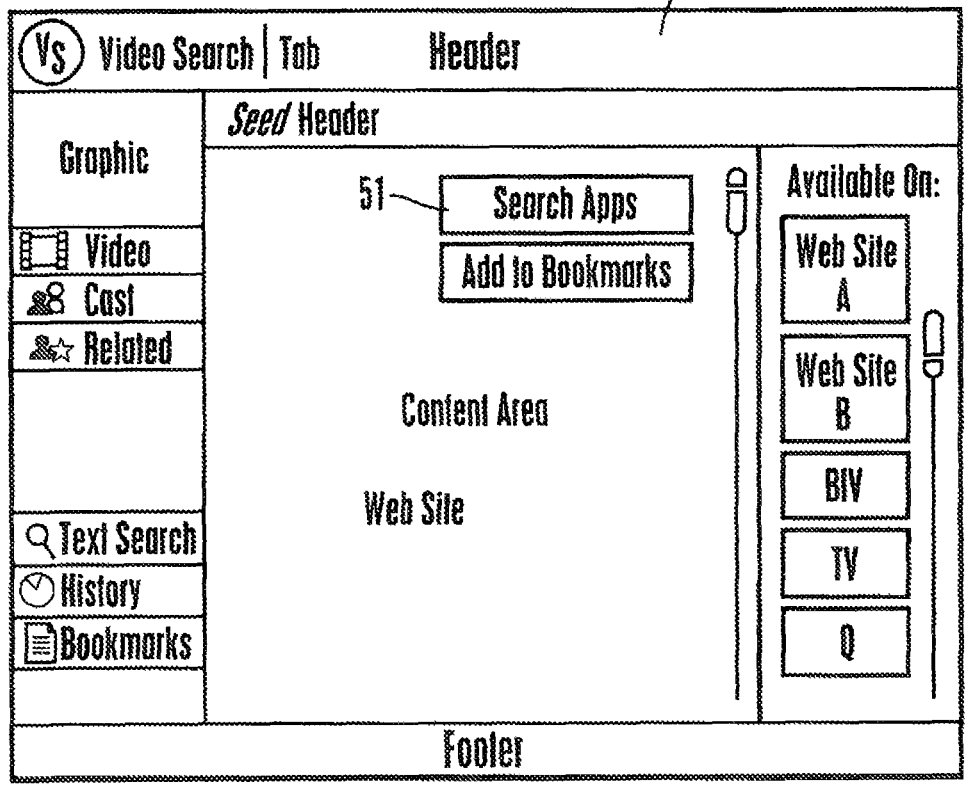

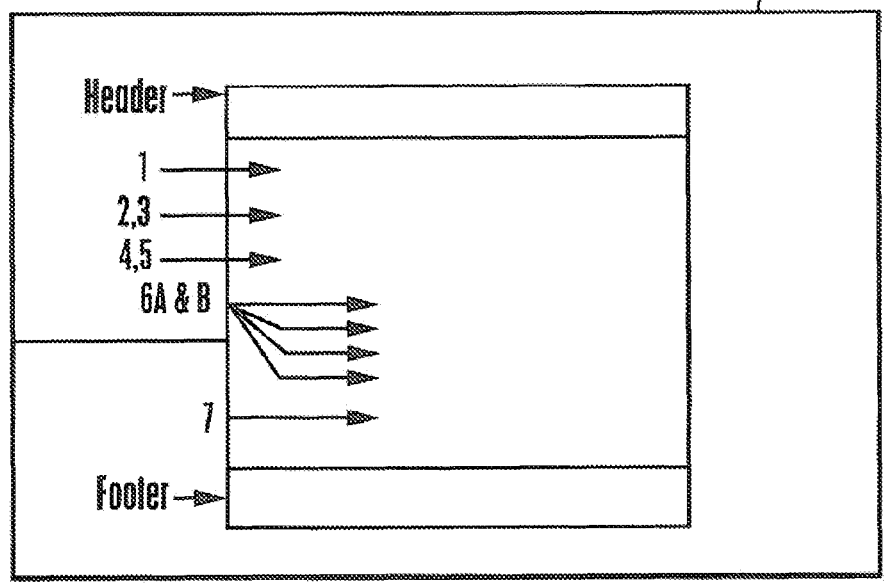

VIDEO SEARCHING USING TV AND USER INTERFACE THEREFOR

This application claims priority from and is a continuation in part of U.S. patent application Ser. No. 13/152,757, filed Jun. 3, 2011.

FIELD OF THE INVENTION

The present application relates generally to video searching using TVs and user interfaces (UI) related to the searching.

BACKGROUND OF THE INVENTION

Audio video (AV) devices such as TVs are growing increasingly capable, enabling viewers to watch videos from a wide range of sources with concomitant features. As understood herein, presenting additional information to viewers in an easy, intuitive, and non-cluttered way is desirable as more consumers demand increased access to supplemental information without wanting to operate computers to obtain the information.

SUMMARY OF THE INVENTION

An audio video (AV) device includes a video display and a processor accessing instructions on a computer readable medium to execute the instructions to control the display to present a user interface (UI) on the display. The UI has top and bottom edges and left and right edges therebetween, and includes plural UI selector elements. The UI has, in order from top to bottom adjacent the left edge, a left-most column of tabbed selector elements including a "video" tab, a "cast" tab, a "related" tab, a "text search" tab, a "history" tab, and a "bookmarks" tab. The "video" tab, "cast" tab, and "related" tab represent types of information and/or AV programs related to a seed input to the processor. Thus, the tabbed selector elements are selectable to cause the information and/or AV programs represented by the respective tab to be presented on a central information/video area of the UI.

Additionally, the UI has, in order from top to bottom adjacent the right edge, a right-most column of iconified selector elements for selecting respective AV program sources, including at least one TV signal source icon and at least one Internet source icon. The iconified selector elements represent sources from which information and/or AV programs related to the seed are available. Thus, the iconified selector elements are selectable to cause information and/or AV programs related to the seed to be received from the respective source and presented on the central information/video area.

Accordingly, in some embodiments, the processor responsive to selection of the "video" tab in a seed mode of "video" may present on the central information/video area a description of a currently input AV program related to the seed. On the other hand, the processor, responsive to selection of the "video" tab in a seed mode of "cast" may present on the central information/video area names of plural AV programs other than the currently input AV program with which a currently designated person associated with the currently input AV program is also associated. In further contrast, the processor responsive to selection of the "cast" tab in the seed mode of "video" may present on the central information/video area names of plural people associated with the currently input AV program, whereas the processor, responsive to selection of the "cast" tab in a seed mode of "cast", may present on the central information/video area biographic information of the currently designated person.

Also in some embodiments, the processor, responsive to selection of the "related" tab, may present on the central information/video area AV programs associated with a currently input AV program including differently edited versions of the currently input AV program. Furthermore, the processor, responsive to selection of the "text search" tab, may present on the central information/video area a pop-window overlaid thereon which may permit a user to select from at least a video category and a cast member category. The window can include a pane into which a user can enter one or more search terms. The processor may thus execute a search on the selected category using the one or more search terms.

In addition to the above, in example embodiments the processor, responsive to selection of the "history" tab, may present on the central information/video area a list of recently viewed AV programs. Also in example embodiments, the processor, responsive to selection of the "bookmark" tab, may present a list of recently viewed AV programs on the central information/video area. The processor may thus receive selection of an AV program on the list of recently viewed AV programs when the bookmark tab is invoked, and in response to the selection the processor may then add the AV program to a bookmark file.

In some implementations, the UI may also include a seed name area along the top edge of the UI. The seed name area indicates the current seed input to the processor and is manipulable by a user to input a new seed. Furthermore, the seed name area may also include a "search" selector element. In response to selection of the "search" selector element, the processor may present on the display a search pop-up window presenting a list of applications and/or services. After receiving selection of an application and/or service from the list and responsive thereto, the processor passes the seed name to the application and/or service selected by the user to execute a database search using the seed name. The processor then executes the application and/or service selected by the user to present results of the search on the display.

The example search pop-up window may also include a textual representation of a video or cast member selectable to search for content related to the video or cast member. Even further, the search pop-up window may present an icon and title of the video or cast member and an icon associated with a service and a name of a search item.

Additionally, if desired, the central information/video area of the UI may at times include links selectable to cause tangential information related to the information and/or the AV program to be presented on the central information/video area. As used herein, "tangential information" is understood to be a non-limiting term that may include any supplementary information not displayed on the central information/video area prior to selection of the link causing the tangential information to be presented. Also, if desired, the UI may at times include a "more" selector element on the central information/video area selectable to scroll at least up, down, left, and right across the central information/video area and/or cause additional information related to the seed to be presented on the central information/video area that was not presented prior to selection of the "more" selector.

In another aspect, an AV device includes a video display and a processor accessing instructions on a computer readable medium to execute the instructions to control the display to present a user interface (UI) on the display. The UI has three regions left to right on the display. The left and right regions contain UI selector elements. The UI also has a center region for presenting information and/or video of an AV program presented by the processor. In the left region, the selector elements include at least a "video" tab, a "cast" tab, and a "related" tab. The "video" tab, "cast" tab, and "related" tab represent types of information and/or AV programs related to a seed input to the processor. Thus, the "video" tab, "cast" tab, and "related" tab are selectable to cause information and/or AV programs represented by the respective tab and related to the seed to be presented on the center region.

In the right region, the selector elements include at least one TV signal source icon and at least one Internet source icon. The icons represent sources from which information and/or AV programs related to the seed are available. Thus, the icons are selectable to cause information and/or AV programs related to the seed to be received from the respective source and presented on the center region.

In still another aspect, a method includes presenting a user interface (UI) on a video display, wherein the UI includes at least three regions on the display. The UI includes a generally central region containing information and/or video of an audio video (AV) program and two regions adjacent the generally central region containing UI selector elements. The selector elements include, in one of the adjacent regions, at least a "video" selector element, a "cast" selector element, and a "related" selector element. The "video" selector element, "cast" selector element, and "related" selector element represent types of information and/or AV programs related to a seed received from a user. Thus, the "video" selector element, "cast" selector element, and "related" selector element are selectable to cause information and/or AV programs represented by the respective selector element and related to the seed to be presented on the generally central region.

The selector elements also include, in the other adjacent regions, at least one TV signal source icon and at least one Internet source icon. The icons represent sources from which information and/or AV programs related to the seed are available. Thus, the icons are selectable to cause information and/or AV programs related to the seed to be received from the respective source and presented on the generally central region.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an example system in accordance with present principles;

FIG. 2 is a flow chart showing example overall logic in accordance with present principles;

FIG. 3 is a flow chart showing example "search apps" logic;

FIG. 4 is a screen shot of a user interface (UI) illustrating various portions and selector elements;

FIG. 5 is a screen shot of a search UI;

FIG. 6 is a screen shot of a UI that is presented responsive to selection of the video tab and the seed is "video";

DETAILED DESCRIPTION OF THE PREFERRED EMBODIMENT

Figure 7:
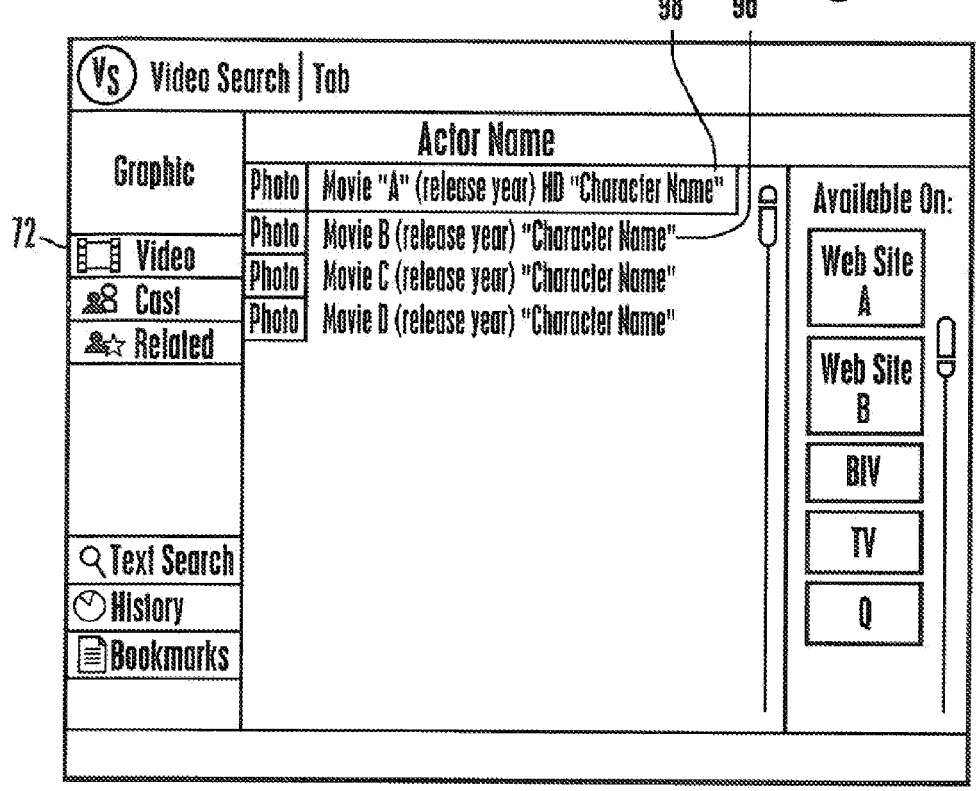
FIG. 7 is a screen shot of a UI that is presented responsive to selection of the video tab and the seed is "cast"

Referring initially to FIG. 1, an audio video (AV) display device 12 such as a TV includes a housing 14 bearing a digital processor 16. The processor 16 can control a visual display 18 and an audible display 20 such as one or more speakers. The visual display may be a touch screen display or high definition TV display or other appropriate video display.

To undertake present principles, the processor 16 may access one or more computer readable storage media 22 such as but not limited to RAM-based storage (e.g., a chip implementing dynamic random access memory (DRAM)) and/or flash memory and/or disk-based storage. Software code implementing present logic executable by the AV device 12 may be stored on one of the memories to undertake present principles.

If desired, in addition to the touch screen the processor 16 can receive user input signals from various input devices, including a keypad, a remote control device 26, a point and click device such as a mouse, etc. A TV tuner 28 may be provided in some implementations particularly when the CE device is embodied by a TV to receive TV signals from a source such as a set-top box, satellite receiver, cable head end, terrestrial TV signal antenna, etc. Signals from the tuner 28 are sent to the processor 16 for presentation on the display 18 and speakers 20.

As shown in FIG. 1, a network interface 30 such as a wired or wireless modem or wireless telephony transceiver communicates with the processor 16 to provide connectivity to one or more Internet servers, including a management server 32 with respective processors 32a and respective computer readable storage media 32b. The management server 32 may provide the AV device 12 with selective access to AV content from one or more asset servers 34. One or more AV input ports 36 can also be provided to receive television programming from respective sources including a disk player, a set top box, a cable head end, a satellite, a terrestrial broadcast antenna.

FIGS. 2 and 3 illustrate logic that the processor 16 accessing the medium 22 may execute. Commencing at block 38 a video search command is received from a viewer operating the below-described user interface (UI) shown in FIG. 4. A video search algorithm is entered at block 40 to present on the display 18 a search UI at block 42. An example search UI is described further below in reference to FIG. 5.

Proceeding to block 44, user selections are received from the search UI. At block 46, responsive to the user selections a database (not Internet) search is conducted for matching content, with results being presented on display 18 at block 48.

FIG. 3 shows more specific search logic. Commencing at block 50, the processor receives from a viewer operating the UI of FIG. 4, a window (labeled "Content Area") of which presents broadcast TV or Internet video content, a selection of a "Video Search" application indicating viewer desire to obtain information about a currently playing video program. The video search application allows users to search for information about videos and cast members and can be entered by manipulating, e.g., the RC 26 to select a "search apps" selector element 51 on the UI of FIG. 4.

Responsive to selection of the "Video Search" application, at block 52 the pop-up UI of FIG. 5 is overlaid onto the UI of FIG. 4, although in some embodiments the UI of FIG. 5 can completely replace the UI of FIG. 4. In any case, a user selection of a "seed" such as a video title or cast member name is received at block 54 and passed to a selected application at block 56. The application searches a predetermined database at block 58 for matching content and returns the content for presentation on the display 18 at block 60.

In the UI shown in FIG. 5, a header may be presented as shown, and the "seed" entered into block #1. The seed may be entered by typing in the name of a title or person and may be automatically correlated to the "video" genus by searching a database of video names and responsive to a match being found, inferring that the viewer has entered a "seed" which is a video title. Similarly, the seed may be automatically correlated to the "cast" genus by searching a database of person names and responsive to a match being found, inferring that the viewer has entered a "seed" which is a cast member name. Or, the viewer may directly enter "video" or "cast" or may toggle between "video" and "cast" using the RC 26.

Block #2 in FIG. 5 may be a video icon when "video" is the seed and block #3 may be the entered video title. Likewise, when "cast" is the seed block #3 may be an icon (e.g., photo) of the selected cast member and block #4 may be the cast title, either personal name, character name, etc. Rows 4 and 5 may be reserved and row #6A and 6B may be an icon and item name, respectively, associated with a selected application, e.g., an Internet TV application or a music search application. Line #7 may be a help text field.

FIGS. 6-14 illustrate various configurations that may be assumed by the UI shown in FIG. 4, hereinafter designated UI 70. In the example shown, the UI 70 includes a left-most column of tabs, in order from top to bottom a video tab 72 (which is depicted as being selected in FIGS. 6 and 7), a cast tab 74 (selected in FIGS. 8 and 9), a related tab 76 (selected in FIG. 10), a text search tab 78 (selected in FIG. 12), a history tab 80 (selected in FIG. 13), and a bookmarks tab 82 (selected in FIG. 14). As discussed further below, the UI 70 can be used to provide links that allow users to navigate to videos and cast members related to content in the main information/video area discussed further below. This creates an "exploratory" environment, enabling users to jump from one group of information to another. The users can access information about the currently playing video. Or the users can access a keyboard in order to enter and then search for any video topic or music track played on the AV device 12.

As shown in FIG. 6, moving to the right on the display 18 a main information/video area 84, labeled "content area" in FIG. 4, occupies the majority of the display area. Description below follows as to what is presented in the main information area 84.

To the right of the main information area 84, in some example implementations a column of selector elements or icons may be presented which a viewer can select respective AV program sources including at least one TV signal source (associated with an icon 86) and at least one Internet source (Internet sources are associated with website icons 88, 90). The icons represent sources from which content related to the seed name is available. An icon is selectable to cause the content related to the seed name to be received from the respective source.

FIG. 6 shows that responsive to selection of the video tab 72 in the above-described seed mode of "video", the processor 16 presents in the main information area 84 of the UI 70 a description 92 of a currently input AV program to the device 12, in the example shown, "movie A". The description, like the other supplemental information described herein responsive to the selection of various tabs, may be downloaded from the management server 32 accessing various asset servers 34. The description can include the year of release of the program, its genre, run time, and language as shown in FIG. 6. Also, the description can include, as shown, a brief summary of the movie connections, production information, and a plot summary. A "more" selector element 94 can be selected to scroll the screen up for additional information on the current AV program.

On the other hand, responsive to selection of the video tab 72 in the seed mode of "cast", as shown in FIG. 7 titles 96 are presented of AV programs other than the currently input AV program 98, with the titles 96 also starring or otherwise associated with a currently designated person associated with the currently input AV program 94. Along with each title 96, the actor's character name in the underlying AV program can be presented as shown along with a release year for that program and if desired, to the left of the title, a photo, e.g., of the actor in the character role.

Figure 8:
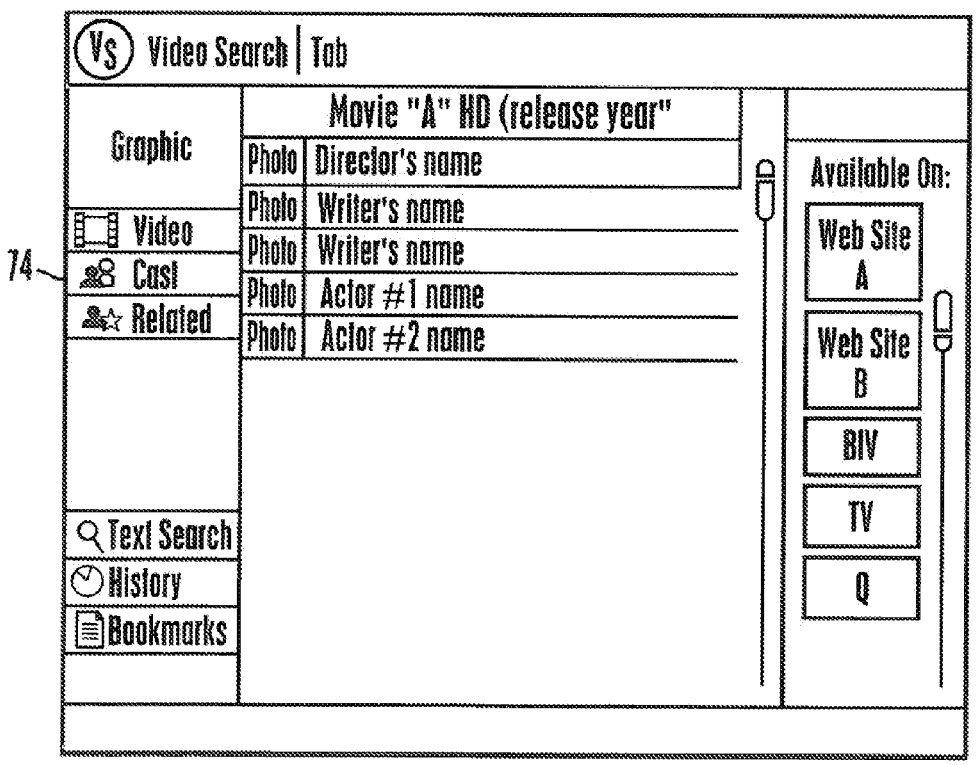
FIG. 8 is a screen shot of a UI that is presented responsive to selection of the cast tab and the seed is "video"
Figure 9:
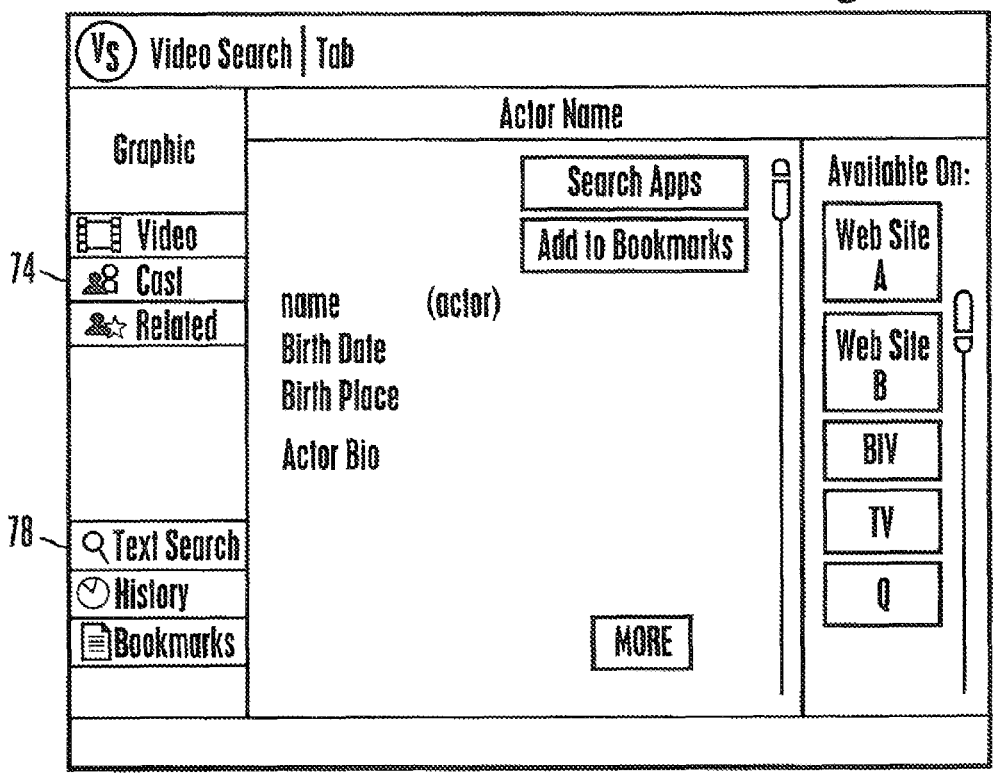
FIG. 9 is a screen shot of a UI that is presented responsive to selection of the cast tab and the seed is "cast"

In further contrast, FIG. 8 shows that responsive to selection of the cast tab 74 while in the seed mode of "video", the UI names of people associated with the currently input AV program and, if desired, their photos, whereas responsive to selection of the cast tab 74 in a seed mode of "cast" (FIG. 9) the processor presents on the UI biographic information of the currently designated person including, e.g., the person's name, date and place of birth, and a brief biography.

Figure 10:
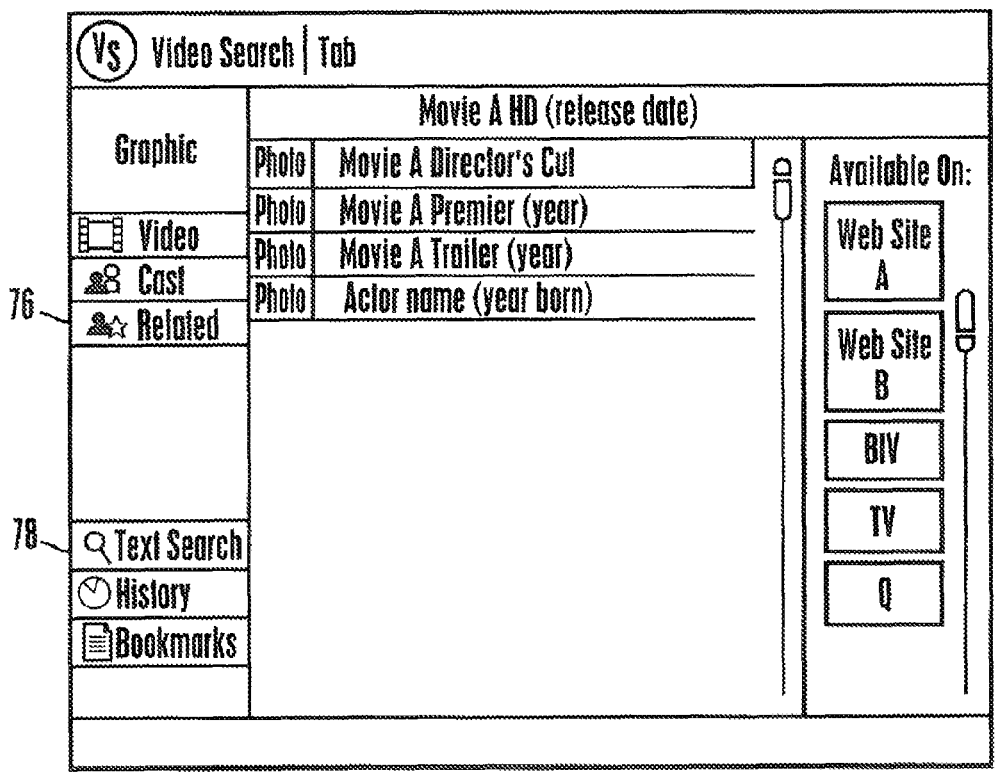
FIG. 10 is a screen shot of a UI that is presented responsive to selection of the "related" tab (seed must be "video")
Figure 11:
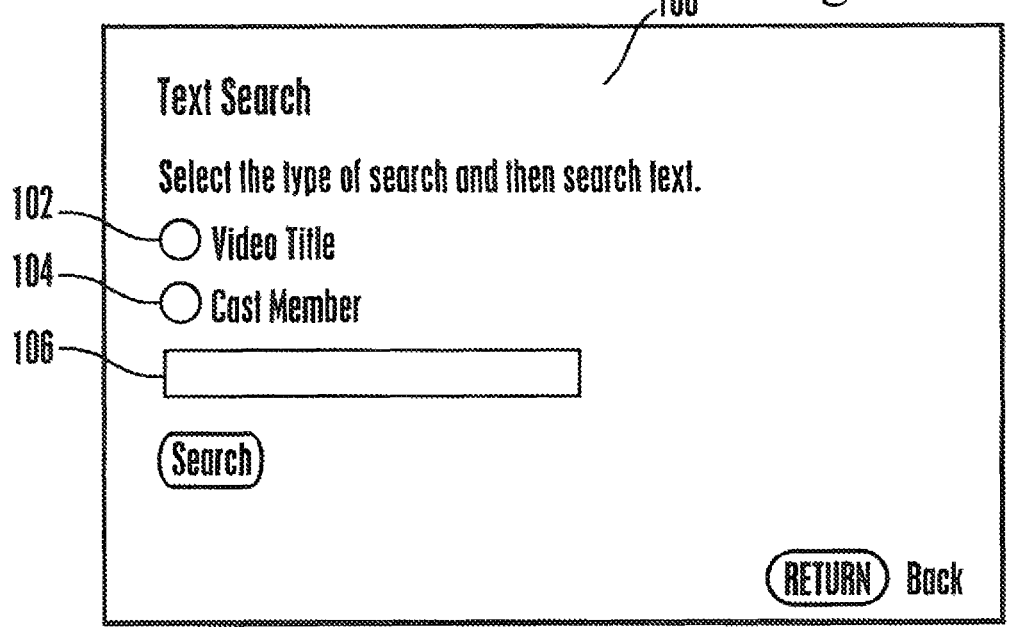
FIG. 11 is a screen shot of a text search pop-up window that is presented when the text search tab is selected.
Figure 12:
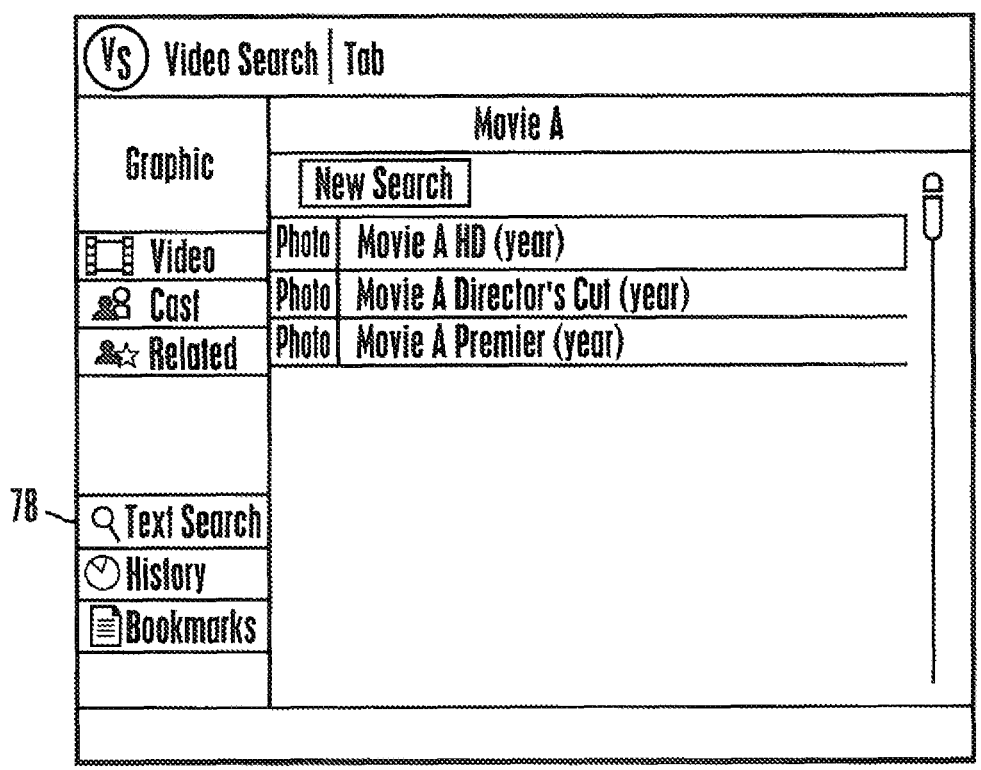
FIG. 12 is a screen shot of a UI that presents results of the search entered from the UI of FIG. 11.

FIG. 10 shows that selection of the related tab 76 causes the processor 16 to present on the UI AV programs that are associated with the currently input AV program including differently edited versions of the currently input AV program, e.g., "premier", "High definition", "trailer", etc. On the other hand, when the text search tab 78 is selected a pop-window 100 may be overlaid on the main UI 70. The pop up window 100 as shown permits a user to select from a video category 102 and a cast member category 104, and in example embodiments no other categories are selectable. The window 100 can include a pane 106 into which a user can enter one or more search terms. The processor executes a search on the selected category using the one or more search terms and then precipitate a search of, e.g., the management server 32 and asset servers 34 only by selecting "search". FIG. 12 shows that when the search is complete the window 100 is removed and the UI 70 presents a list of video programs that confirm to the query input into the window 100, including accompanying photos if desired and release year.

Figure 13:
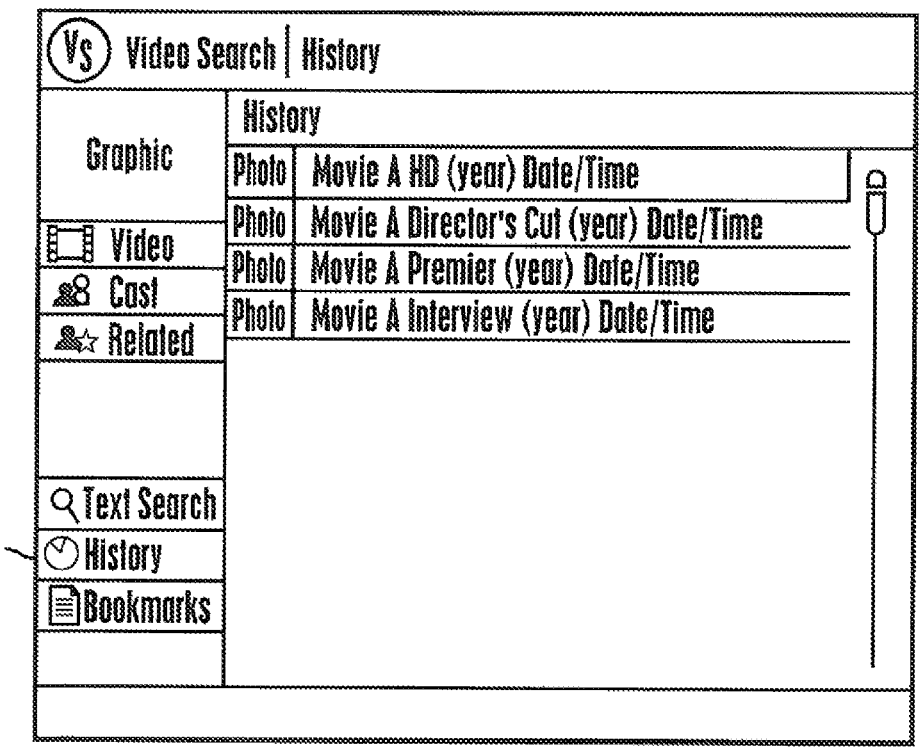
FIG. 13 is a screen shot of a UI that is presented responsive to selection of the seed history tab (seed can be "video" or "cast")
Figure 14:
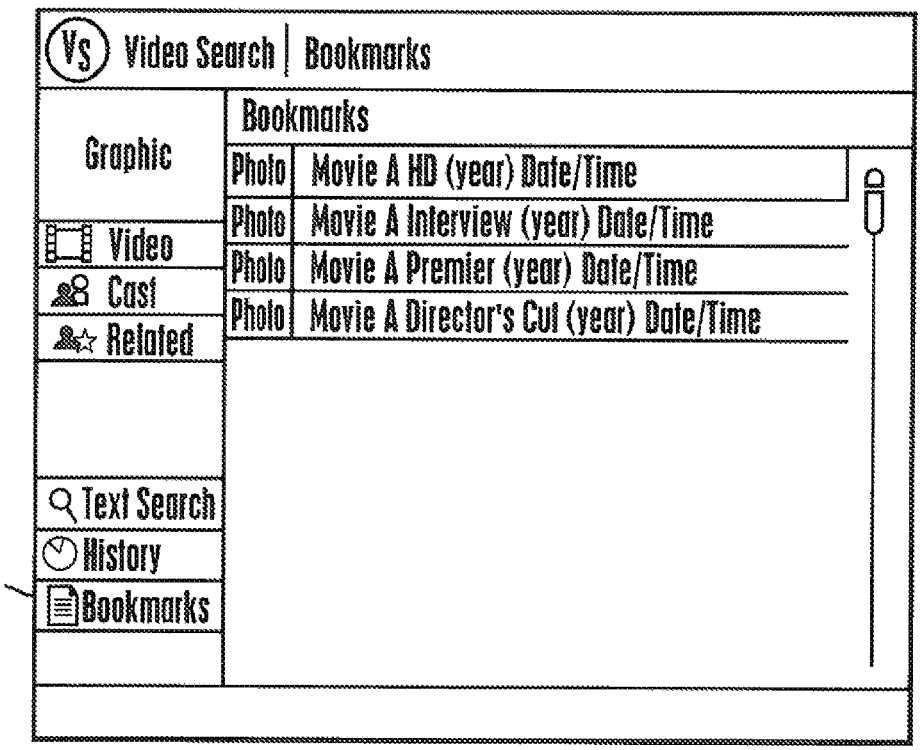
FIG. 14 is a screen shot of a UI that is presented responsive to selection of the bookmark tab.

Still further, selection of the "history" tab 80 as shown in FIG. 13 causes the UI 70 to present a list of recently viewed AV programs. FIG. 14 illustrates that selection of the "bookmark" tab 82 causes the UI 70 to present a list of recently viewed AV programs. The processor 16 can receive selection of an AV program on the list of recently viewed AV programs when the bookmark tab is invoked and in response to the selection add the AV program to a bookmark file.

Additional details related to the principles described above follow.

TABLE 1

Video Search Areas

| Area | Content Tabs: Video, Cast, Related | Feature Tabs: Text Search, History, Bookmarks |
|---|---|---|
| Header | Application header | |
| Graphic | Seed image | Image for the feature |
| Tab Navigation | Mechanism to select the desired tab. Users scroll up and down to navigate between the tabs. | |
| Seed Header | Content type icon & Seed of type icon search | Text Search: Content & Search string (or blank if no seed) History & Bookmarks: Title of tab |
| Content Area | Information about the seed, Add to Bookmarks button*, Search Apps button* *Details View only | Search: Search Results History: History of selected seeds Bookmarks: List of user-saved seeds. |
| Search Apps button | Initiate Search Apps feature - hidden in list view | Not displayed |
| Add to Bookmarks button | Add current seed to Bookmarks - hidden in list view | Not displayed |
| Links | Links related to content area. | Not displayed |
| Footer | Application footer | |

*This is the text displayed in the footer when the focus is on a tab. When the focus is on a text screen (pop-up window), the text string for <RETURN> is "Back."

Format of the Content Area
The Content area can present data in two formats: details view and list view.
  Details view: one result with many details about the result. Often includes paragraphs of description. For an example, refer to the Video tab when the seed=video.
  List view: many results with few details about each result. For an example, refer to the Video tab when the seed=cast
If there is no seed, then the Content tabs may be grayed out, in which case the UI 70 never gives them focus. The text in the seed header area depends upon the tab. For Video, Cast, or Related Tabs, the content type icon and seed may be displayed, but if there is no seed, users in some embodiments cannot access these tabs. For the text search tab content type icon and search string are displayed and if the user has not yet performed a search, then the header may display a generic text search icon and the string "text search."
  When the user selects the add to bookmarks button, the UI adds the current seed as a bookmark. This button is displayed in the content area of the Content tabs, when the tabs are in description view. The button is hidden when the tab is in list view.
  As described above, the "Available On" links are links that are related to the seed. They are populated by the server-side database (management server 32). If there is no data from the database, then the UI displays the message, "Nothing available." When a user scrolls to these links, the right pane expands to display text about each item. This content can be refreshed ever time the user selects a new seed. The text next to each link is specific to Video Search. Each item can support up to three lines of text. The text is as follows:
  Line 1: Name of Service
  Line 2: Name of Video/Cast Member
  Line 3: Cost of Service
  While the particular VIDEO SEARCHING USING TV AND USER INTERFACES THEREFOR is herein shown and described in detail, it is to be understood that the subject matter which is encompassed by the present invention is limited only by the claims.

What is claimed is:

1. An audio video (AV) device comprising:
   a processor accessing instructions on a computer readable medium to execute the instructions to control a video display to present a user interface (UI) on the display, wherein the UI has top and bottom edges and left and right edges therebetween, and has plural UI selector elements including:
   in order from top to bottom adjacent the left edge, a leftmost column of tabbed selector elements including a "video" tab, a "cast" tab, a "related" tab, a "text search" tab, a "history" tab, and a "bookmarks" tab, wherein the "video" tab, "cast" tab, and "related" tab represent types of information and/or AV programs related to a seed input to the processor, wherein the tabbed selector elements are selectable to cause the information and/or AV programs represented by the respective tab to be presented on a central information/video area of the UI; and
   in order from top to bottom adjacent the right edge, a right-most column of iconified selector elements for selecting respective AV program sources, including at least one TV signal source icon and at least one Internet source icon, wherein the iconified selector elements represent sources from which information and/or AV programs related to the seed are available, wherein the iconified selector elements are selectable to cause information and/or AV programs related to the seed to be received from the respective source and presented on the central information/video area, wherein:
   wherein the processor when executing the instructions is configured for:
   responsive to selection of the "video" tab in a seed mode of "video", presenting a description of a currently input AV program related to the seed;
   responsive to selection of the "video" tab in a seed mode of "cast", presenting names of plural AV programs other than the currently input AV program;
   responsive to selection of the "cast" tab in the seed mode of "video", presenting names of at least one person associated with the currently input AV program;
   responsive to selection of the "cast" tab in a seed mode of "cast", presenting biographic information of a currently designated person.

2. The AV device of claim 1, wherein the central information/video area of the UI includes links selectable to cause tangential information related to the information and/or the AV program to be presented on the central information/video area.

3. The AV device of claim 1, wherein the UI further includes a "more" selector element on the central information/video area selectable to scroll the central information/video area and/or cause additional information related to the seed to be presented on the central information/video area that was not presented prior to selection of the "more" selector.

4. The AV device of claim 1, wherein the processor when accessing the instructions is configured to, responsive to selection of the "video" tab in a seed mode of "video" present on the central information/video area a description of a currently input AV program related to the seed, the processor when accessing the instructions is configured to, responsive to selection of the "video" tab in a seed mode of "cast" present on the central information/video area names of plural AV programs other than the currently input AV program with which a currently designated person associated with the currently input AV program is also associated, the processor when accessing the instructions is configured to, responsive to selection of the "cast" tab in the seed mode of "video" present on the central information/video area names of plural people associated with the currently input AV program, the processor when accessing the instructions is configured to, responsive to selection of the "cast" tab in a seed mode of "cast" present on the central information/video area biographic information of the currently designated person.

5. The AV device of claim 1, wherein the processor when accessing the instructions is configured to, responsive to selection of the "related" tab present on the central information/video area AV programs associated with a currently input AV program including differently edited versions of the currently input AV program.

6. The AV device of claim 1, wherein the processor when accessing the instructions is configured to, responsive to selection of the "text search" tab presents on the central information/video area a pop-window overlaid thereon and permitting a user to select from at least a video category and a cast member category, the window including a pane into which a user can enter one or more search terms, the processor when accessing the instructions is configured for executing a search on the selected category using the one or more search terms.

7. The AV device of claim 1, wherein the processor when accessing the instructions is configured to, responsive to selection of the "history" tab present on the central information/video area a list of recently viewed AV programs.

8. The AV device of claim 1, wherein the processor when accessing the instructions is configured to, responsive to selection of the "bookmark" tab present a list of recently viewed AV programs on the central information/video area, the processor when accessing the instructions is configured for receiving selection of an AV program on the list of recently viewed AV programs when the bookmark tab is invoked and in response to the selection adding the AV program to a bookmark file.

9. The AV device of claim 1, wherein the UI further includes a seed name area along the top edge of the UI indicating the current seed input to the processor, the seed name area also being manipulable by a user to input a new seed, and a "search" selector element, wherein the processor when accessing the instructions is configured to, responsive to selection of the "search" selector element present on the display a search pop-up window presenting a list of applications and/or services, the processor when accessing the instructions is configured for receiving selection of an application and/or service from the list and responsive thereto passing the seed name to the application and/or service selected by the user to execute a non-Internet database search using the seed name, the processor when accessing the instructions is configured for executing the application and/or service selected by the user to present results of the search on the display.

10. The AV device of claim 9, wherein the search pop-up window includes a textual representation of a video or cast member selectable to search for content related to the video or cast member, the search pop-up window further presenting an icon and title of the video or cast member, the search pop-up window further presenting an icon associated with a service and a name of a search item.

11. An audio video (AV) device comprising:
a processor accessing instructions on a computer readable medium to execute the instructions to control a video display to present a user interface (UI) on the display, wherein the UI has three regions left to right on the display, the left and right regions containing UI selector elements, and a center region for presenting information and/or video of an AV program, wherein the selector elements include:
in the left region, a "video" tab, a "cast" tab, and a "related" tab, wherein the "video" tab, "cast" tab, and "related" tab represent types of information and/or AV programs related to a seed input to the processor, wherein the "video" tab, "cast" tab, and "related" tab are selectable to cause information and/or AV programs represented by the respective tab and related to the seed to be presented on the center region; and
in the right region, at least one TV signal source icon and at least one Internet source icon, wherein the icons represent sources from which information and/or AV programs related to the seed are available, wherein the icons are selectable to cause information and/or AV programs related to the seed to be received from the respective source and presented on the center region, wherein the processor when executing the instructions is configured to:
responsive to selection of the "video" tab in a seed mode of "video", present a description of a currently input AV program related to the seed;
responsive to selection of the "video" tab in a seed mode of "cast", present at least one name of an AV program other than the currently input AV program with which a currently designated person associated with the currently input AV program is also associated;
responsive to selection of the "cast" tab in the seed mode of "video", present names of plural people associated with the currently input AV program;
responsive to selection of the "cast" tab in a seed mode of "cast", present information relating to the currently designated person.

12. The AV device of claim 11, wherein the center region includes links selectable to cause tangential information related to the information and/or the AV program to be presented on the center region.

13. The AV device of claim 11, wherein the UI further includes a "more" selector element on the center region selectable to scroll the central information/video area and/or cause additional information related to the seed to be presented on the center region that was not presented prior to selection of the "more" selector.

14. The AV device of claim 11, wherein the processor when executing the instructions is configured to, responsive to selection of the "video" tab in a seed mode of "video" present on the center region a description of a currently input AV program related to the seed, the processor when executing the instructions is configured to, responsive to selection of the "video" tab in a seed mode of "cast" present on the center region names of plural AV programs other than the currently input AV program with which a currently designated person associated with the currently input AV program is also associated, the processor when executing the instructions is configured to, responsive to selection of the "cast" tab in the seed mode of "video" present on the center region names of plural people associated with the currently input AV program, the processor when executing the instructions is configured to, responsive to selection of the "cast" tab in a seed mode of "cast" present on the center region biographic information of the currently designated person.

15. The AV device of claim 11, wherein the processor when executing the instructions is configured to, responsive to selection of the "related" tab present on the center region AV programs associated with a currently input AV program including differently edited versions of the currently input AV program.

16. The AV device of claim 11, wherein the UI further includes a fourth region including a seed name area indicating the current seed input to the processor, the seed name area also being manipulable by a user to input a new seed, and a "search" selector element, wherein the processor when executing the instructions is configured to, responsive to selection of the "search" selector element present on the display a search pop-up window presenting a list of applications and/or services, the processor when executing the instructions is configured for receiving selection of an application and/or service from the list and responsive thereto passing the seed name to the application and/or service selected by the user to execute a non-Internet database search using the seed name, the processor when executing the instructions is configured for executing the application and/or service selected by the user to present results of the search on the display.

17. The AV device of claim 11, wherein the search pop-up window includes a textual representation of a video or cast member selectable to search for content related to the video or cast member, the search pop-up window further presenting an icon and title of the video or cast member, the search pop-up window further presenting an icon associated with a service and a name of a search item.

18. A method, comprising:
presenting a user interface (UI) on a video display, wherein the UI includes at least three regions on the display, including a generally central region containing information and/or video of an audio video (AV) program and two regions adjacent the generally central region containing UI selector elements, wherein the selector elements include:
in one of the adjacent regions, a "video" selector element, a "cast" selector element, and a "related" selector element, wherein the "video" selector element, "cast" selector element, and "related" selector element represent types of information and/or AV programs related to a seed received from a user, wherein the "video" selector element, "cast" selector element, and "related" selector element are selectable to cause information and/or AV programs represented by the respective selector element and related to the seed to be presented on the generally central region; and in another of the adjacent regions, at least one TV signal source icon and at least one Internet source icon, wherein the icons represent sources from which information and/or AV programs related to the seed are available, wherein the icons are selectable to cause information and/or AV programs related to the seed to be received from the respective source and presented on the generally central region;
responsive to selection of the "video" selector element in a seed mode of "video", presenting a description of a currently input AV program related to the seed;
responsive to selection of the "video" selector element in a seed mode of "cast", presenting names of plural AV programs other than the currently input AV program with which a currently designated person associated with the currently input AV program is also associated;
responsive to selection of the "cast" selector element in the seed mode of "video", presenting names of plural people associated with the currently input AV program; and
responsive to selection of the "cast" selector element in a seed mode of "cast", presenting information related to the currently designated person.

19. The method of claim 18, wherein:
responsive to selection of the "video" selector element in a seed mode of "video", presenting on the center region a description of a currently input AV program related to the seed;
responsive to selection of the "video" selector element in a seed mode of "cast", presenting on the center region names of plural AV programs other than the currently input AV program with which a currently designated person associated with the currently input AV program is also associated;
responsive to selection of the "cast" selector element in the seed mode of "video", presenting on the center region names of plural people associated with the currently input AV program; and
responsive to selection of the "cast" selector element in a seed mode of "cast", presenting on the center region biographic information of the currently designated person.

20. The method of claim 18, wherein responsive to selection of the "related" selector element, presenting on the center region AV programs associated with a currently input AV program including differently edited versions of the currently input AV program.

* * * * *